Patented Nov. 29, 1938

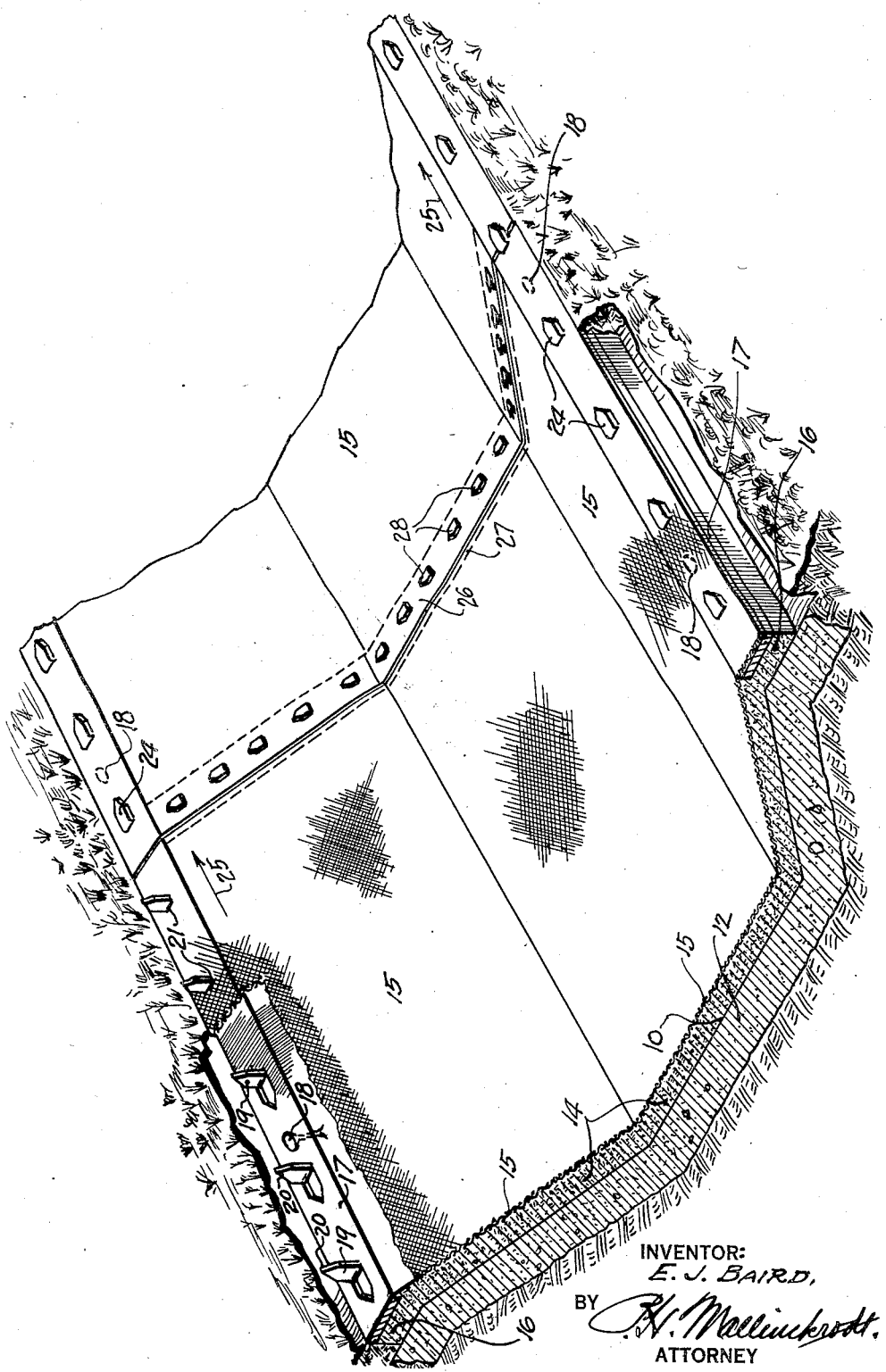

REISSUED JAN 1943

2,138,366

UNITED STATES PATENT OFFICE 2,138,366

PROTECTIVE LINING FOR CANALS

Edgar J. Baird, Soda Springs, Idaho

Application May 24, 1937, Serial No. 144,329

14 Claims. (Cl. 61—7)

This invention relates to a protective lining for canals, especially irrigation canals, though its use is not necessarily restricted thereto, since the lining is also well adapted for reservoirs, artificial lakes, swimming pools, earth dams, and other earthworks ordinarily subjected to contact with water saturation.

The principal objects of the invention are to provide:
*First.*—Means for preventing the loss of water through seepage.

*Second.*—Means for killing or preventing vegetable growth.

*Third.*—A lining substantially impervious to water and having great elasticity and flexibility, thereby serving to prevent cracking brought about by the tendency of a lining to buckle because of expansion and contraction or because of heaving or settling of the earth underneath.
*Fourth.*—A lining which is easily and quickly installed, but which is extremely durable and relatively inexpensive.

Irrigation canals are usually open channels cut in the earth, and are generally subject to considerable loss of water through seepage. Naturally, the longer the canal, the greater the seepage loss becomes. It has been found in practice, that the loss ordinarily varies from 25 to 35 per cent in only a few miles of canal length. Not infrequently, the earth material through which such a canal is cut, is of such a nature that the seepage loss becomes as much as 70 per cent of the water entering the canal.

Concrete linings of various kinds have heretofore been tried and have been found unsatisfactory for a number of reasons, the principal one being its deterioration through cracking.

Because of its elasticity and flexibility, my novel lining may advantageously be made continuous in almost any desired length.

In installing the lining, the earth surface is first scarified to a suitable depth, and the loosened soil is then thoroughly waterproofed and compacted, which not only forms a foundation for the lining proper, but at the same time, prevents or kills any vegetable growth.

In the drawing, the single figure represents in perspective, a portion of a canal equipped with my invention, and shows in the foreground, a cross-section of the lining as well as a layer of scarified and prepared earth on which the lining rests.

Referring to the drawing, numeral 10 indicates the earth surface of an excavated channel to form the canal. Below this surface, preferably to a depth of 4 to 8 inches, the earth is scarified by means of any well known implement. A suitable waterproofing compound is applied to the scarified layer of earth, and thoroughly incorporated therewith, preferably to the point of saturation. Such a waterproofing compound may advantageously consist of what is known in the market as R. C. asphaltic oil No. 1 or No. 2, applied under high pressure by means of a suitable nozzle. While the waterproofing substance is not necessarily applied under pressure in all cases, as just stated, it is especially advantageous to do so where soils are of such natures that a waterproofing substance does not readily penetrate by merely contacting the top surface of a scarified layer of soil. In such instances of difficult penetration, the advantage of putting the waterproofing substance under considerable pressure, and the reason for its employment, is obvious, in that the resistance of individual particles of the soil to the penetration of the waterproofing substance, as well as its certain entry into the interstices between the lumps, is overcome.

After applying the oil, the well-soaked soil is thoroughly compacted, preferably by rolling, to form the layer 12. On top of the layer 12 is spread and bonded thereto a layer of sawdust or any suitable fibrous substance, shredded as required, and which has previously been thoroughly saturated with what is known as M. C. asphaltic oil, either No. 2 or No. 3. The asphaltic oils impart waterproofing properties to the fibrous substance and at the same time may serve as binders for forming the component parts of the fibrous material into a united mass.

The use of the aforenamed oils is exemplary, but by no means necessarily exclusive. These oils are identified by the following standard specification requirements.

| Test requirements | RC-1 | RC-2 |
|---|---|---|
| Flash point, deg. F | 80-plus | 80-plus |
| Viscosity Saybolt furol at 122 deg. F., sec | 80–160 | 200–400 |
| Total distillate to 374 deg. F., percent by vol | 5-plus | 0.00 |
| Total distillate to 437 deg. F., percent by vol | 12-plus | 10-plus |
| Total distillate to 600 deg. F., percent by vol | 25-plus | 20-plus |
| Total distillate to 680 deg. F., percent by vol | 40-minus | 35-minus |
| Penetration of residue, 100 G, 5 sec. 77 deg. F | 80–120 | 80–120 |
| Ductility of residue, 77 deg. F., cms | 70-plus | 70-plus |
| Solubility of residue in $CS^2$ percent | 99.5-plus | 99.5-plus |
| Percent of residue sol. in $CS^2$ in $CCl^4$ | 99.65 | 99.65 |

NOTE.—"RC" stands for rapid curing.

| Test requirements | MC-2 | MC-3 |
|---|---|---|
| Flash point, deg. F | 150-plus | 150-plus |
| Viscosity Saybolt furol at 140 deg. F., sec | 150–250 | 300–500 |
| Total distillate to 437 deg. F., percent by vol | 2-minus | 2-minus |
| Total distillate to 600 deg. F., percent by vol | 10–20 | 8–20 |
| Total distillate to 680 deg. F., percent by vol | 27-minus | 25-minus |
| Penetration of residue, 100 G, 5 sec. 77 deg. F | 100–300 | 100–300 |
| Ductility of residue, 77 deg. F. cms | 60-plus | 60-plus |
| Solubility of residue in $CS^2$ percent | 99.5-plus | 99.5-plus |
| Percent of residue sol. in $CS^2$ in $CCl^4$ | 99.65 | 99.65 |

NOTE.—"MC" stands for medium curing.

The oiled sawdust or fibrous material in a plastic state, is thoroughly compacted by rolling or otherwise, into a finished layer 14. The layer 14 may have any suitable thickness, which ordinarily may be two inches or thereabouts, but this may be varied to serve individual conditions. On top of the layer 14 is spread a sheet 15 of textile material, for example, cotton cloth or burlap, this being mopped with the asphaltic oil and cemented to the plastic layer 14. In some instances, especially where the lining is of a temporary nature, the sheet of textile material may be omitted and the water of a canal or other confining means, be allowed to contact the exposed surface of the compacted layer of fibrous material.

If desired, the marginal portions or flanges 16 of the plastic lining may be reinforced with strips or bands 17, of metal, preferably galvanized iron. The metal strips may be fastened to the marginal flanges 16 by an occasional anchor 18 or by any other suitable means. The metal strips are brought to the job fabricated, with upstanding lugs 19 formed by punching, and constituting preferably an integral part of the strip. The lugs 19 are sharpened at the top 20 in any suitable way, so as to pierce the marginal portions of the textile sheet 15, as indicated at 21. After so piercing the marginal sheet portions, the lugs may be flattened down as indicated at 24, by means of a heavy roller (not shown) propelled along each marginal portion in the desired direction, for example, as indicated by the arrows 25. The textile sheets may be applied with their length transverse to the longitudinal dimension of a canal, and adjacent sheets may have marginal portions overlapping, as indicated at 26. Below the doubled marginal portions of adjacent sheets may be placed a metallic strip 27 of similar fabrication to the strips 17. Each strip 27 may be provided with lugs which, after piercing the doubled marginal portions of adjacent sheets, are susceptible of being rolled down, as shown at 28, similar to the lugs 24.

For convenience, the detailed description appearing hereinbefore, and the drawing, are directed definitely to a canal lining, but by implication, any water-confining earthwork is included, as touched upon earlier herein.

Frequently it is advantageous to sprinkle a coating of sand, fine gravel, or stone chips, or a suitable combination of any or all of these materials, upon the oiled textile sheet before the oil thereof, dries. Such materials may be scattered by hand, or forcibly by any suitable means, for example, a blast of air or other fluid.

My invention contemplates heating or thinning the oil or oils, if necessary or desirable at any stage of the proceedings, in order to secure the proper degree of fluidity for promoting the thorough penetration of the oil into all parts of the materials concerned. The end in view is the formation of a resilient, waterproof, felted lining which not only accommodates itself without injury to variations in the ground surface and to extreme variations in temperature resulting in excessive expansion and contraction, but also is proof against objectionable vegetable growths.

While a specific embodiment of the invention is herein shown and described, it is understood that numerous changes in the minor details thereof, may be made without departing from the spirit of the following claims.

What I claim is:

1. A canal lining, comprising a layer of earth impregnated with an oily waterproofing substance, a layer of plastic resilient material substantially impervious to water on top of the first-mentioned layer, and a sheet of textile material on top of the second-mentioned layer.

2. A canal lining, comprising a layer of waterproofed soil, a layer of flexible, water-proofed, plastic material on top of the first-mentioned layer, and a sheet of textile material cemented to the top surface of the plastic layer.

3. A canal lining, comprising a layer of compacted, waterproofed soil, a water-proofed compacted plastic layer of fibrous material on top of the first-mentioned layer and bonded thereto, and a sheet of oil-soaked textile material cemented to the top surface of the said plastic layer.

4. A canal lining, comprising an elastic, water-proofed base having its upper surface covered with a sheet of textile material cemented to the elastic base.

5. A canal lining, comprising an elastic base conforming to the contour of the canal and projecting over the upper marginal limits thereof, a sheet of textile material cemented to the upper surface of the elastic base and having its marginal portions overlapping the marginal projections of the elastic base, and means for fastening the marginal portions of the textile sheet to the marginal projections of the elastic base.

6. A canal lining in accordance with claim 5, wherein the said means for fastening the marginal portions of the textile sheet to the said marginal projections of the elastic base, consists of a band of metal resting on the said marginal projections, and having lugs piercing the said marginal portions of the textile sheet, the said piercing lugs being flattened upon the textile sheet to hold the marginal portions thereof in engagement with the said metal band.

7. Means for fastening portions of a textile sheet to a plastic canal lining, comprising a metal band anchored to the plastic canal lining, said metal band having a plurality of upstanding lugs integral therewith, the said lugs being disposed to pierce the textile sheet, and to be flattened down over the textile sheet for the purpose of holding the same in engagement with the metal band.

8. Lining a canal to make the same substantially waterproof, comprising scarifying the earth surface of the canal to a suitable depth, impregnating the layer of scarified soil with waterproofing substance, compacting the scarified, waterproofed layer of soil, spreading a layer of oil-soaked, fibrous material upon the compacted waterproofed layer of soil, compacting the oil-soaked layer of fibrous material, and cementing a textile sheet to the upper surface of the layer of compacted fibrous material.

9. Lining a canal, comprising scarifying the inner earth surface of the canal excavation to a suitable depth, impregnating the scarified soil with a suitable oil projected into the loose, scarified soil under high pressure, compacting the oil-impregnated, scarified soil into a definite layer, spreading fibrous material impregnated with a suitable binder upon the said layer, and compacting the binder-impregnated fibrous material into a second definite layer superimposed upon the first-mentioned layer and bonded thereto.

10. Lining to a canal in accordance with claim 10, but including the step of spreading a sheet of textile fabric upon the compacted, binder-impregnated, fibrous material, and cementing the textile sheet into close contact therewith.

11. Lining a canal in accordance with claim 10, but including the step of spreading a sheet of textile fabric upon the compacted, binder-impregnated fibrous material, soaking the textile fabric with an asphaltic substance, cementing the soaked textile sheet into close contact with the compacted fibrous material, and sprinkling a layer of sand over the cemented textile fabric before the asphaltic substance dries.

12. A canal lining, including in combination, a layer of compacted soil impregnated and waterproofed with oil, and a compacted layer of asphaltic-oil-saturated sawdust bonded to the layer of compacted soil.

13. A canal lining in accordance with claim 13, but with the difference that a textile covering is suitably attached to the upper surface of the compacted sawdust layer.

14. Lining an earth channel or earth depression, to make the same waterproof, comprising scarifying the earth surface to a suitable depth, projecting waterproofing substance under pressure into the scarified earth, compacting the scarified earth so waterproofed, spreading a layer of waterproofed, fibrous material upon the compacted waterproofed earth, and compacting the layer of waterproofed fibrous material.

EDGAR J. BAIRD.

CERTIFICATE OF CORRECTION.

Patent No. 2,138,366.   November 29, 1938.

EDGAR J. BAIRD.

It is hereby certified that error appears in the printed specification of the above numbered patent requiring correction as follows: Page 2, second column, lines 68 and 72, claims 10 and 11 respectively, for the claim reference numeral "10" read 9; page 3, first column, line 11, claim 13, for "claim 13" read claim 12; and that the said Letters Patent should be read with this correction therein that the same may conform to the record of the case in the Patent Office.

Signed and sealed this 24th day of January, A. D. 1939.

Henry Van Arsdale (Seal)   Acting Commissioner of Patents.